United States Patent [19]

Larson et al.

[11] Patent Number: 5,139,317
[45] Date of Patent: Aug. 18, 1992

[54] TRACK GUIDING APPARATUS

[75] Inventors: Michael P. Larson, Metamora; Alan H. Lonn, Edelstein, both of Ill.

[73] Assignee: Caterpillar Inc., Peoria, Ill.

[21] Appl. No.: 678,274

[22] PCT Filed: Mar. 29, 1991

[86] PCT No.: PCT/US91/02063

§ 371 Date: Mar. 29, 1991

§ 102(e) Date: Mar. 29, 1991

[51] Int. Cl.$^5$ .................. B62D 55/088; B62D 55/10
[52] U.S. Cl. ................................. 305/12; 305/28; 305/58 R; 180/6.7; 180/8.7; 180/9.1
[58] Field of Search .................. 305/12, 16, 17, 18, 305/21, 24, 28, 58 R; 180/6.7, 8.7, 9.1

[56] References Cited

U.S. PATENT DOCUMENTS

| | | | |
|---|---|---|---|
| 1,318,188 | 10/1919 | Tritton | 305/28 |
| 2,049,693 | 8/1936 | Eberhard | 305/12 |
| 2,418,610 | 4/1947 | Webb | 305/12 X |
| 2,810,297 | 10/1957 | Drewrys | 74/254 |
| 3,336,087 | 8/1967 | Reinsma | 305/27 |
| 3,601,454 | 8/1971 | Reinsma | 305/11 |
| 4,006,940 | 2/1977 | Halterman, Jr. | 305/12 |
| 4,082,371 | 4/1978 | Werner et al. | 305/56 |
| 4,097,093 | 6/1978 | Shelby et al. | 305/28 X |
| 4,229,053 | 10/1980 | Cline | 305/28 |
| 4,387,779 | 6/1983 | Pisani | 180/9.5 |

Primary Examiner—Russell D. Stormer
Attorney, Agent, or Firm—Claude F. White

[57] ABSTRACT

A track guiding apparatus (10) for guiding the track links (22) of a moving undercarriage system (12) of a track-type vehicle having a track roller frame (18) and a plurality of track rollers (20) includes a support bracket assembly (14) secured to the roller frame (18) and a plurality of guide bars (16) secured to the support bracket assembly (14). Each of the guide bars (16) has a contact surface (50, 52) adapted to contact a hardened rail portion (56) of the track links (22) when the links (22) are moved laterally. The track guiding apparatus (10) prevents de-railing of the track links (22) from the track rollers (20) due to irregular ground conditions or when foreign material becomes lodged between the rollers (20) and the links (22).

6 Claims, 3 Drawing Sheets

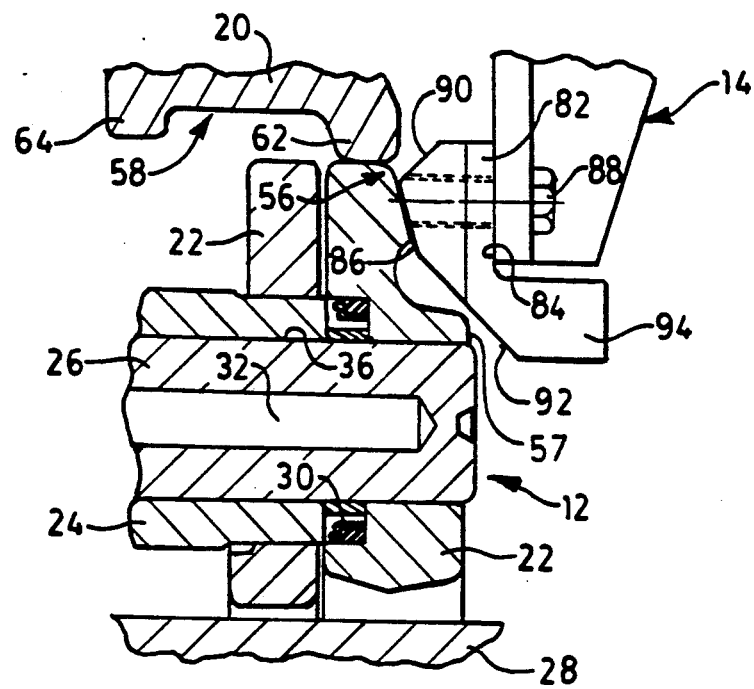
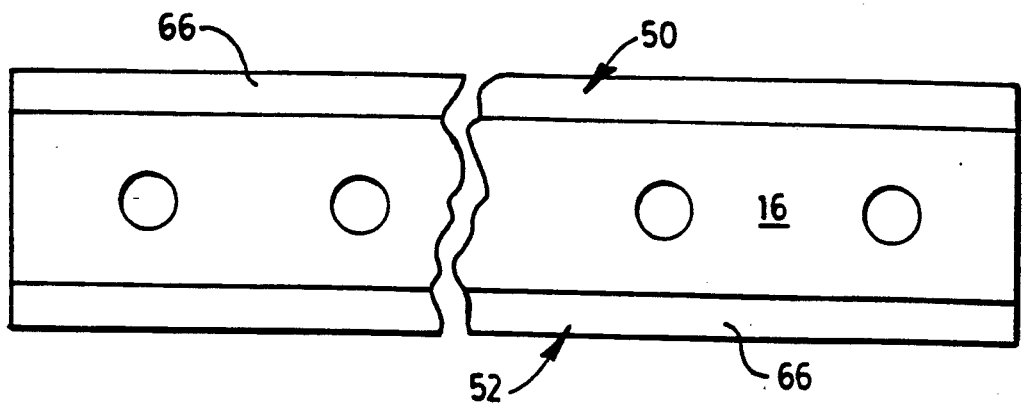

TRACK GUIDING APPARATUS

DESCRIPTION

1. Technical Field

This invention relates generally to a track guiding apparatus for maintaining an endless track in engagement with guide rollers and more particularly to a guiding apparatus having a plurality of guide bars which are adapted to contact the hardened rail portions of the track links.

2. Background Art

Earthmoving and construction vehicles which utilize endless track chains to support and propel the vehicle often experience disengagement of the track chain from the guide rollers. Although the guide rollers are generally provided with flanges to guide the track chain as it passes along the rollers, irregular ground conditions may allow the track chain to fall away from the rigidly positioned guide rollers. Additionally, debris is often trapped between the rollers and the track chain and forces the track chain to disengage from the rollers. This can disable the vehicle and cause damage to the undercarriage components. To prevent track chain disengagements, various types of track guides have been proposed.

One type of track guide and rock guard assembly is disclosed in U.S. Pat. No. 4,006,940, issued on Feb. 8, 1977, to F. J. Halterman, Jr. The track guides in this patent include horizontal legs attached to the rock guards and positioned adjacent the track pins. Lateral movement of the track will cause the track pins to engage the guides and limit further lateral movement. Over extended periods of time, this engagement between the moving pins and the stationary guides damages the pins, making it difficult to remove the pins for servicing the track assembly.

Another type of track guide is disclosed in U.S. Pat. No. 3,336,087 issued on Aug. 25, 1967, to H. L. Reinsma. In this patent, the track guide bars are a portion of a resilient suspension system for a track-type tractor and serve to preload the shear path suspension elements as well as guide the track. The guide bars are positioned adjacent the ends of the track pins and engage the pins and the boss area of the track links when the track moves laterally. This engagement damages the ends of the pins and the boss area of the links and makes disassembly of the track assembly difficult. Such damage and wear on the pins and link bosses also increases track joint play, which decreases sealability of the track joints.

The present invention is directed to overcoming one or more of the problems as set forth above.

DISCLOSURE OF THE INVENTION

In one aspect of the present invention, a track-type vehicle has a track roller frame and a moving undercarriage, including a plurality of interconnected links with each of the links having a rail portion, and a track guiding apparatus for the vehicle includes a support bracket assembly secured to the vehicle and a replaceable guide bar secured to the support bracket assembly and adapted to contact the rail portions of the links when the links move laterally.

Self-laying track-type vehicles are supported and propelled by endless track assemblies, including a plurality of interconnected track links, pins, and bushings. The links engage a plurality of rollers, and flanges associated with the rollers guide the moving track assembly. Guide bars spaced laterally from the pins and links are often used to prevent the track from separating from the rollers. Repeated engagement between the ends of the pins and the links and the guide bars damages the pins and links. Such damage makes disassembly of the track difficult and reduces the effectiveness of seals within the track assembly. The subject invention provides track guiding members which guide the track through contact with the hard rail portions of the track link. The pins, and the joints between the pins and the links, suffer no damage from the track guides, thereby extending the useful life of the track seals and simplifying disassembly of the track.

BRIEF DESCRIPTION OF THE DRAWINGS

FIG. 4 is a diagrammatic view similar to FIG. 2 showing a third embodiment of the present invention; and FIG. 5 is a diagrammatic plan view of the track guide member shown in FIGS. 1 and 2.

BEST MODE FOR CARRYING OUT THE INVENTION

Figure 1:
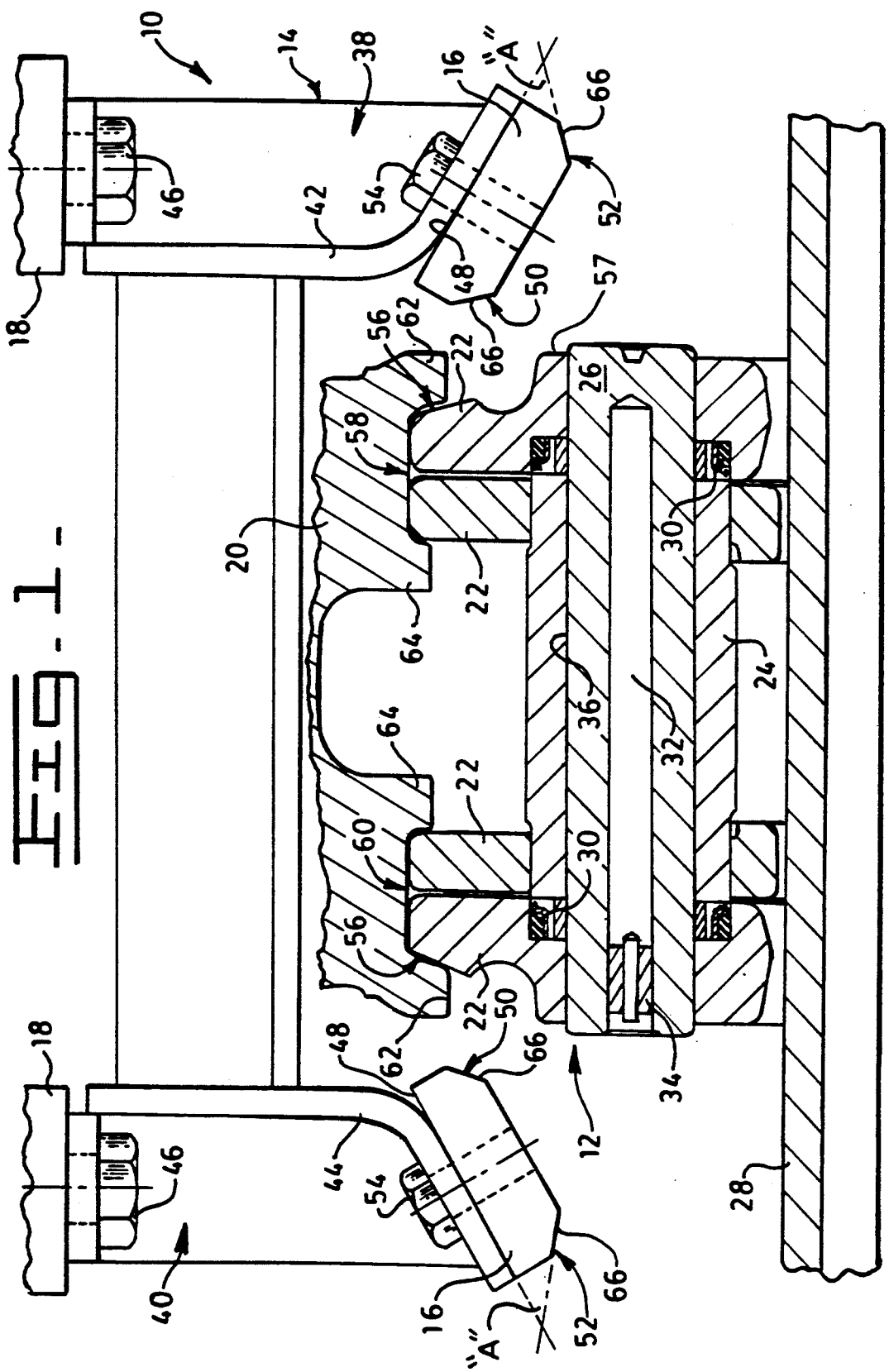
FIG. 1 is a diagrammatic front elevational view, partly in section, of a track guide apparatus of the present invention, including portions of a track roller and a track assembly.
Figure 2:
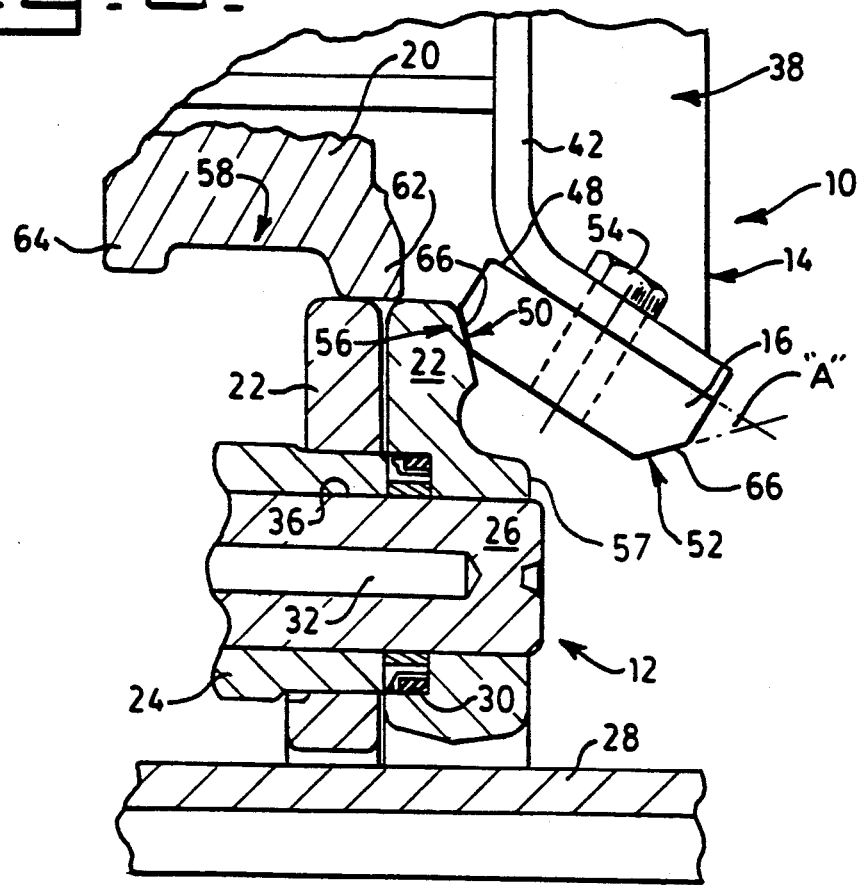
FIG. 2 is a diagrammatic view of a portion of the apparatus shown in FIG. 1, with the subject track guide in contact with a track link of the track assembly.

Referring to the drawings, and in particular FIGS. 1, 2, and 5, a track guiding apparatus 10, for guiding the moving undercarriage components 12 of a track-type vehicle (not shown), includes a support bracket assembly 14 and a plurality of replaceable guide bars 16. The vehicle includes a track roller frame 18 which supports a plurality of track rollers 20 and the moving undercarriage components 12. The track rollers 20 are rigidly secured to the roller frame 18. The undercarriage components 12 include a plurality of track links 22, a plurality of bushings 24, a plurality of pins 26, and a plurality of track shoes 28. The links 22 are interconnected by the pins 26 and the bushings 24 and the track shoes 28 are removably secured to the links 22. Each of the links 22 has a seal assembly 30 and each of the pins 26 has an internal oil reservoir 32 which is closed by a plug 34. The oil reservoir 32 is adapted to lubricate the surface 36 between the pin 26 and the bushings 24, and the seal assemblies 30 maintain the lubricant within the undercarriage components 12.

The bracket assembly 14 has first and second end portions 38,40 and first and second angled leg members 42,44. The first and second end portions 38,40 are secured to the track roller frame 18 by a plurality of threaded fasteners 46. Each of the guide bars 16 has a mounting surface 48 and first and second guiding portions 50,52. Each of the guide bars 16 is adapted to be joined to one of the first and second leg members 42,44 of the support bracket assembly 14 at the mounting surface 48 by a plurality of threaded fasteners 54. Each of the track links 22 has a hardened rail portion 56 which, during normal operation of the vehicle, is adapted to contact first and second hardened rim portions 58,60 of the track roller 20. Each of the rim portions 58,60 has first and second radially extending flanges 62,64 which guide the track links 22 during normal operation of the vehicle.

With particular reference to FIG. 2, the track links 22 can occasionally become disengaged from the confines of the track roller flanges 62,64 and move laterally toward the guide members 16. Such disengagement of the track links 22 is generally the result of irregular ground conditions, which allow the moving undercarriage components 12 to fall away from the track rollers 20, or debris which has become lodged within the undercarriage components 12. When the track links 22 are moved laterally, the guiding portions 50,52 of the guide bars 16 are adapted to contact the link rail portions 56 and restrict further lateral movement of the track links 22. Each of the links 22 includes a pin boss portion 57 which is spaced from the link rail portion 56. The guide bars 16 are adapted to contact the link rail portion 56 and not the pin boss portion 57. The links 22 will move back within the confines of the first and second flanges 62,64 when the vehicle weight shifts to the unguided track, the vehicle passes over smoother ground, or the debris has been ejected from the undercarriage components 12. Each of the guide bars 16 is rotatable on the support bracket assembly 14 to position one of the first or second guide portions 50,52 adjacent the link rail portions 56. This provides at least two wear areas on each of the guide bars 16. Each of the guiding portions 50,52 has a contact surface 66 which contact the link rail portions 56 when the links 22 move laterally. Each of the contact surfaces 66 forms an acute angle "A" with the mounting surface 48.

Figure 3:
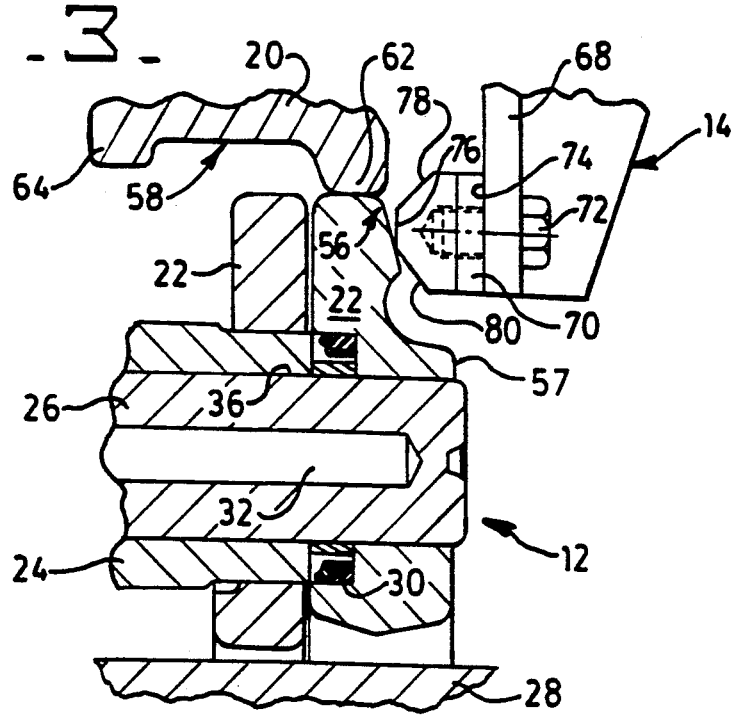
FIG. 3 is a diagrammatic view similar to FIG. 2 showing a second embodiment of the present invention.

With particular reference to FIG. 3, an alternate embodiment of the present invention is shown. In this embodiment, the bracket assembly 14 has a straight leg portion 68 and a guide bar 70 is secured by threaded fasteners 72 to the leg portion 68. The guide bar 70 has a mounting surface 74 and a contact surface 76 which is substantially parallel to the mounting surface 74. The guide bar 70 has first and second angled wall portions 78,80, and is rotatable about the fasteners 72 to provide multiple wear areas. Angled wall portions 78,80 provide clearance witdh the track roller flange 62 when the guide bar 70 is rotated.

With particular reference to FIG. 4, a second alternate embodiment of the present invention is shown. In this embodiment a guide bar 82 has a mounting surface 84 and a contact surface 86, and is secured to the leg portion 68 by a plurality of threaded fasteners 88. The guide bar 82 has first and second angled wall portions 90,92 which intersect with the contact surface 86, and a body portion 94 which extends below the leg 68 of the bracket assembly 14.

INDUSTRIAL APPLICABILITY

With reference to the drawings, the subject track guiding apparatus 10 is particularly useful with earthmoving and construction vehicles and more specifically, self-laying track-type vehicles. Because track-type earthmoving vehicles often operate in harsh environments, which include irregular ground conditions and debris, the track may fall away from the track rollers 20 or debris may be ingested into the moving undercarriage components 12. This debris, such as rocks, dirt, and tree limbs, can become lodged between the track rollers 20 and the track links 22. This causes the rail portions 56 of the links 22 to be displaced out of contact with the rollers 20 and the first and second flanges 62,64. The entire track assembly then moves laterally to either side, and if not restrained, derails from the guide rollers 20.

The subject track guiding apparatus 10 will restrict the lateral movement of the track links 22 and guide the undercarriage components 12 until the links 22 return to their normal operating position within the confines of the track roller flanges 62,64. However, because the contact with the guide bars 16 is on the hardened rail portions 56 of the links 22, the ends of the pins 26 are not worn or damaged by the guide bars 16. Therefore, the pins 26 can be removed without difficulty when any of the undercarriage components 12 need servicing or replacing. Eliminating damage to the pins also extends the life of the seal assemblies 30, which helps maintain the lubricant within the oil reservoir 32.

After prolonged operation of the vehicle, and repeated contact between the link rail portions 56 and the first guiding portions 50 of the guide bars 16, the first guiding portions 50 will become worn. At this time, the threaded fasteners 54 are removed, the guide bars 16 are rotated, and the fasteners 54 are threaded back into place in the guide bars 16. A new unworn second guiding portion 52 is now in position adjacent the link rail portions 56 to guide and restrain the displaced links 22.

Other aspects, objects and advantages of this invention can be obtained from a study of the drawings, the disclosure, and the appended claims.

We claim:

1. A track guiding apparatus for guiding the moving undercarriage components of a track-type vehicle, said vehicle including a track roller frame, said undercarriage components including a plurality of interconnected links, each of said links having a rail portion, said guiding apparatus comprising:
   a support bracket assembly secured to said track roller frame; and
   a replaceable guide bar having a mounting surface and a guiding portion, said guide bar being adapted to be joined to said support bracket assembly at said mounting surface, and said guiding portion being positioned in the pathway of said link rail portion during lateral movement of said links, said guiding portion being adapted to contact only said link rail portion of the links during lateral movement of said links a preselected distance.

2. A track guiding apparatus, as set forth in claim 1, wherein said guide bar has first and second guide portions, and said guide bar is rotatable on said support bracket assembly between a first position at which said first guide portion is adjacent said link rail portions and a second position at which said second guide portion is adjacent said link rail portions.

3. A track guiding apparatus, as set forth in claim 1, wherein said guiding portion of said bar has a contact surface, said contact surface forming an acute angle "A" with said mounting surface in the installed position of the guide bar.

4. A track guiding apparatus (10), as set forth in claim 1, wherein said guiding portion (50,52) of said guide bar (16) has a contact surface (66), said contact surface (66) being substantially parallel to said mounting surface (48).

5. A track guiding apparatus for guiding the moving undercarriage components of a track-type vehicle, said vehicle having a track roller frame and a plurality of track rollers rigidly secured to said roller frame said undercarriage components including a plurality of interconnected track links, each of said links having a rail portion, said track rollers being adapted to guide said links by contacting said rail portions, said guiding assembly comprising:
- a support bracket assembly secured to said track roller frame; and
- a replaceable and reversible guide bar having a mounting surface and first and second guiding portions, said first and second guiding portions having first and second contact surfaces respectively, said guide bar being adapted to be joined to said support bracket assembly at said mounting surface, and said contact surfaces being adapted to contact only said link rail portions of the links when said links are moved laterally a preselected distance.

6. A track guiding apparatus (10), as set forth in claim 5, wherein each of said contact surfaces (66) forms an acute angle "A" with said mounting surface (48).

* * * * *